(12) United States Patent
Yoo

(10) Patent No.: US 6,212,088 B1
(45) Date of Patent: Apr. 3, 2001

(54) MODULAR VOLTAGE ADAPTER AND METHOD FOR USING SAME

(75) Inventor: Woo Sik Yoo, Palo Alto, CA (US)

(73) Assignee: WaferMasters Incorporated, San Jose, CA (US)

( * ) Notice: Subject to any disclaimer, the term of this patent is extended or adjusted under 35 U.S.C. 154(b) by 0 days.

(21) Appl. No.: 09/451,493

(22) Filed: Nov. 30, 1999

(51) Int. Cl.$^7$ ........................................ H02M 1/00
(52) U.S. Cl. ............................................... 363/146
(58) Field of Search ...................... 36/144, 146; 307/29, 307/30, 38, 41

(56) References Cited

U.S. PATENT DOCUMENTS

| | | | |
|---|---|---|---|
| 5,347,211 | * 9/1994 | Jakubowski | 323/351 |
| 5,568,370 | * 10/1996 | Goldenstein et al. | 363/34 |
| 5,599,204 | 2/1997 | Glassford | 439/502 |
| 5,726,875 | 3/1998 | Hirabayashi et al. | 363/142 |
| 5,838,559 | * 11/1998 | Lam | 363/146 |
| 5,885,109 | * 3/1999 | Lee et al. | 439/652 |
| 6,067,241 | * 5/2000 | Lu | 363/65 |

* cited by examiner

Primary Examiner—Matthew Nguyen
(74) Attorney, Agent, or Firm—Skjerven Morrill Macpherson LLP; Theodore P. Lopez

(57) ABSTRACT

An adapter used in conjunction with voltage modules to provide multiple and variable DC output voltages. The adapter may include a circuit for stepping down an AC input voltage to lower AC output voltages. A voltage module is provided having an interface bus, configured to be coupleable to a distribution bus on the voltage adapter. Preferably, the voltage module includes AC-DC conversion circuitry, such that the AC output voltages received from the adapter may be converted to DC voltages. Once the adapter and voltage module are coupled together, the voltage module allows the user to select among the multiple DC output voltages provided. In some embodiments, the adapter includes additional circuitry for converting the stepped-down AC voltages into DC output voltages. Additional separate voltage modules may be coupled to the first voltage module, in series, to form a modular stack of voltage modules. Like the first voltage module, the second voltage module may have a selectable output voltage, as well.

20 Claims, 4 Drawing Sheets

MODULAR VOLTAGE ADAPTER AND METHOD FOR USING SAME

BACKGROUND OF THE INVENTION

1. Field of the Invention

This invention relates to voltage adapters and, more particularly to an alternating current to direct current (AC-DC) voltage adapter including modules for providing multiple and variable DC output voltages.

2. Description of the Related Art

Conventional AC-DC adapters, used to convert an AC voltage, using a transformer, to a predetermined DC voltage, are well known and are used extensively. AC-DC adapters are generally able to receive a single AC input voltage and transform the AC voltage into a single DC output voltage. Some adapters have the capability to receive one of a variety of AC input voltages and subsequently, convert it to a single DC output voltage. This type of adapter is particularly useful for international travelers, who may encounter different commercial power standards in various countries.

Although, conventional AC-DC adapters are useful in providing AC-DC voltage conversion, the adapters are typically useful only with one electrical appliance at a time. Since the transformer in a conventional adapter is generally configured to provide one DC output voltage per AC input voltage, the adapter cannot be used simultaneously with multiple appliances requiring different DC operating voltages. Thus, each appliance must have provided a separate adapter. In the situation where access to AC power is limited to one, or else a few sources, the simultaneous use of multiple appliances requiring AC-DC conversion is limited.

What is needed is an adapter, which can provide multiple, simultaneous DC output voltages from a single AC power source.

SUMMARY OF THE INVENTION

The present invention provides a voltage adapter, which may be used in conjunction with voltage modules to provide multiple and variable DC output voltages from a single AC input voltage. In accordance with one embodiment of the present invention, the voltage adapter includes a circuit for stepping down an AC input voltage to multiple, lower AC output voltages. The AC output voltages are then accessible through a voltage distribution bus. Advantageously, a voltage module is provided having an interface bus configured to be coupleable to the distribution bus on the voltage adapter. Preferably, the voltage module includes the capability of converting or transforming the AC output voltages received from the adapter to DC output voltages. Once the adapter and voltage module are coupled together, the module allows the user to select among the multiple DC output voltages provided.

In another embodiment, the voltage adapter includes the conversion capability for converting the stepped-down AC voltages into DC output voltages. The selected DC output voltage from the voltage module is sent out from the voltage module via a wire pair or the like, to an appropriate appliance plug, to power an appliance or other device.

In accordance with the present invention, the voltage module has a module distribution bus, similar in configuration to the distribution bus on the voltage adapter. The module distribution bus allows for an additional separate voltage module to be coupled to the first voltage module to form a modular stack of voltage modules. Like the first voltage module, the second voltage module may have a selectable output voltage. In the manner described above, multiple voltage modules may be stacked together, as desired. Once, a desired number of modules are stacked together, an end cap is provided for coupling to the final distribution bus for protection of the module and the user.

In one aspect of the invention, an arrangement of interconnected voltage adapter modules is provided. A converter module connectable to a power source is included for converting AC electrical power to a plurality of output voltages. Also included is a first voltage module, electrically coupleable to the converter module. The first voltage module is configured to provide a settable DC output voltage selected from the plurality of output voltages.

In yet another aspect of the invention, an arrangement of interconnected voltage adapter modules is provided including a means for providing a plurality of output voltages. A first adapter module is also provided which has a means for selecting and outputting one of the plurality of output voltages.

In yet another aspect of the invention, a method is provided for providing a variable output voltage from a single power source through an arrangement of interconnected voltage modules. The method includes transforming an AC voltage into a plurality of output voltages; converting the output voltages to alternate output voltages; and selecting and outputting one of the converted output voltages.

In yet another aspect of the invention, a method is provided for providing a variable output voltage from a single power source through an arrangement of interconnected voltage modules. The method includes providing an AC-DC adapter which transforms an AC voltage into a plurality of output voltages. The method also includes coupling a first voltage module to the adapter, where the voltage module has a voltage selector means. The method further includes selecting and outputting one of the plurality of converted output voltages.

These and other features and advantages of the present invention will be more readily apparent from the detailed description of the preferred embodiments set forth below taken in conjunction with the accompanying drawings.

DESCRIPTION OF THE PREFERRED EMBODIMENT

Figure 1A:
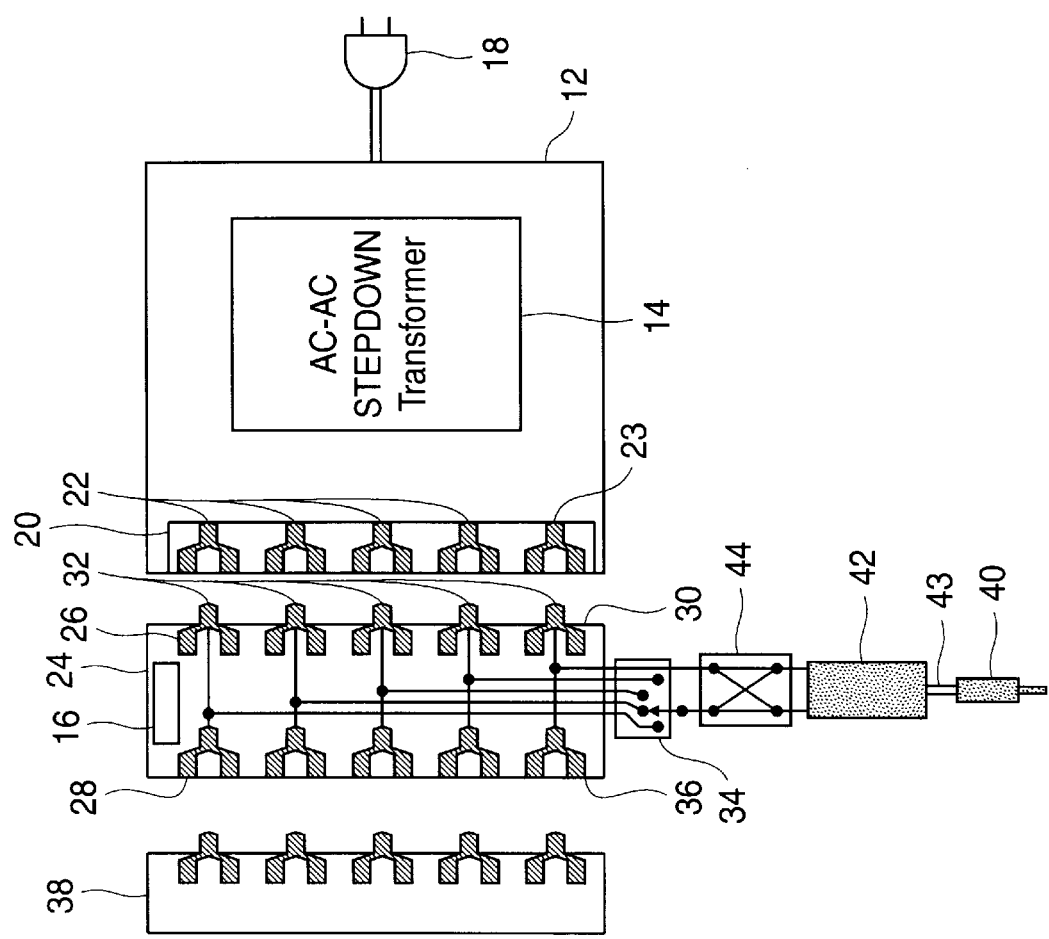
FIG. 1A is a simplified schematic illustration of a voltage module and a voltage adapter in accordance with the principles of the present invention.

FIG. 1A is a simplified schematic illustration of a voltage module and a voltage adapter in accordance with the principles of the present invention. In this embodiment, voltage adapter 12, includes an AC-AC step-down transformer 14 and a voltage distribution bus 20. Adapter 12 receives power from an AC power source through cord 18. AC step-down transformer 14 is configurable to step-down the AC input voltage into a plurality of lesser AC voltages. AC step-down transformer 14 may receive a variable AC input voltage from the AC power source ranging from about 100 VAC to about 240 VAC, preferably 110 VAC. Transformer 14 converts the AC input voltage into a lesser voltage, ranging from about a fraction of a volt to about 24 VAC or higher. The stepped-down AC output voltage is then carried by voltage distribution bus 20 to be used, for example, in DC voltage modules 24 as described in more detail below. In this embodiment, voltage module 24 includes AC-DC voltage conversion circuitry 16. Voltage module 24 receives the AC output voltages from adapter 12 and converts the AC voltages into corresponding DC output voltages using well known AC-DC voltage conversion circuitry 16, such as bridge circuitry. Step-down transformers for stepping down voltages are well known and their functions are well understood. The transformers are available commercially or may be custom built by one of skill in the art of step-down transformers.

Figure 1B:
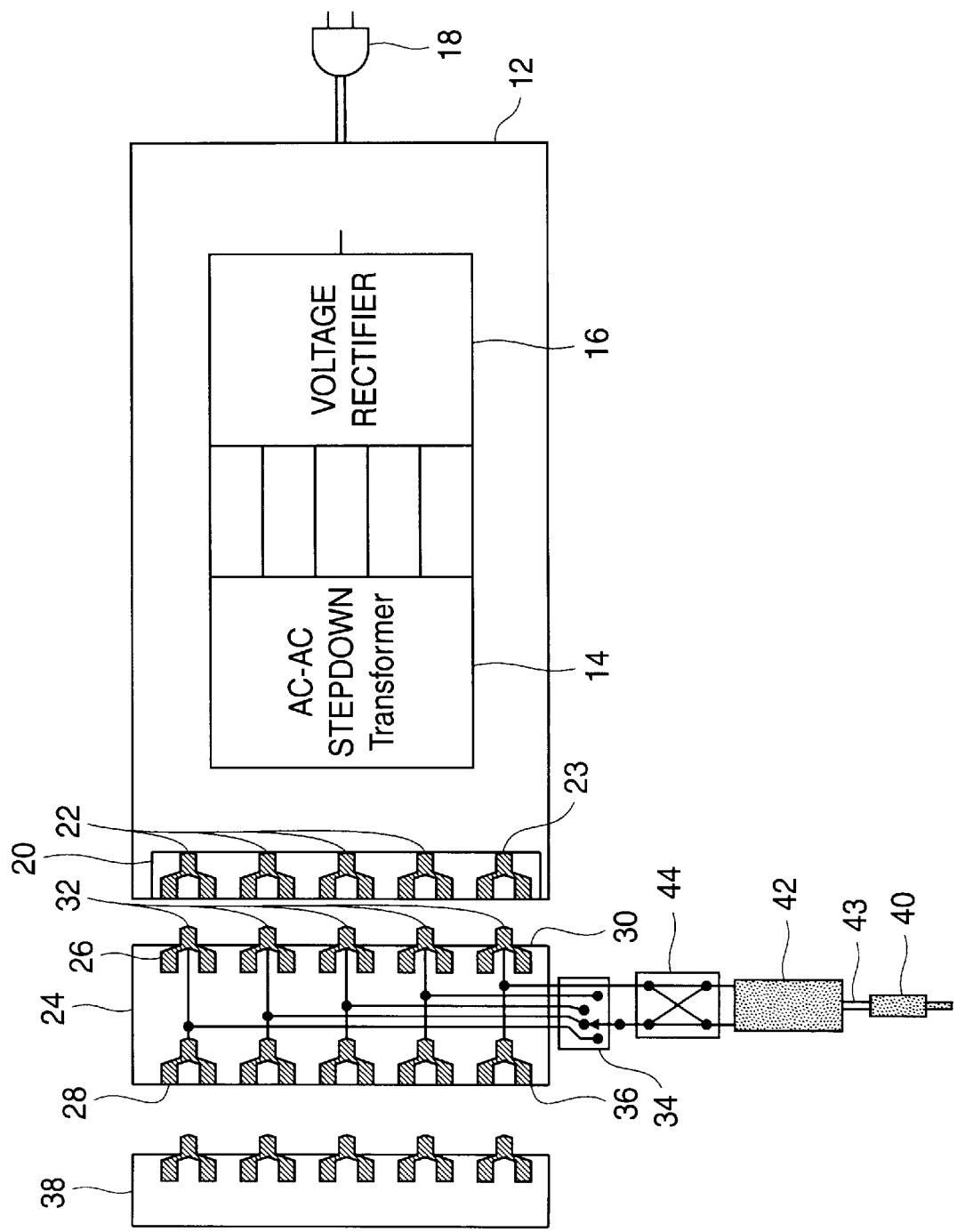
FIG. 1B is a simplified illustration of an alternative embodiment of a voltage module and a voltage adapter in accordance with the principles of the present invention.

In an alternative embodiment shown in FIG. 1B, voltage adapter 12 may also include voltage rectifier 16. Rectifier 16 receives the stepped-down AC voltages developed across the secondary side of transformer 14. The rectifier converts each of the AC voltages to a corresponding DC voltage using a bridge rectifier, which is well-known and understood in the AC-DC conversion art. The DC output voltages may each have a different value, which varies between a fraction of a volt to upwards of 24 VDC. In one embodiment, the DC output voltages range from about 1 VDC to 25 VDC. In a more preferred embodiment, the DC output voltages range from about 3 to 12 VDC. For example, the DC output voltages may equal 1.5, 3, 4.5, 6, 7.5, 9, 10.5, 12, and 15 VDC. The stepped-down AC voltages are converted to DC output voltages within adapter 12. Thus, output voltages from adapter 12 at receptacles 22 are DC voltages. In this embodiment, voltage module 24 may not require any additional AC-DC voltage conversion circuitry.

Referring again to FIGS. 1A, and 11B, voltage adapter 12 includes adapter voltage distribution bus 20, which is used to carry each of the multiple output voltages from adapter 12, whether the output voltage is an AC voltage, as shown in FIG. 1A, or a DC voltage, as shown in FIG. 11B. In a preferred embodiment, distribution bus 20 has electrical contacts or receptacles 22 and a ground contact 23. Distribution bus 20 may be designed with any number of receptacles 22, as space permits, but no less than one receptacle for each output voltage. Electrical receptacles 22 may be any conventional electrical connection devices, such as DB5, DB 25, and DIN 5 connectors and the like, but preferably are female electrical sockets. As described in greater detail below, adapter distribution bus 20 is coupled to at least one voltage module in order to make the output voltages selectable and accessible to appliances and the like.

As shown in FIGS. 1A and 1B, voltage module 24 in accordance with an embodiment of the present invention, includes two electrical buses, a module reception bus 26 and a module distribution bus 28, a voltage selector mechanism 34, and a plug 40, coupled to voltage module 24 via cord 43. Reception bus 26 is provided on a first face 30 of module 24, and includes a set of terminals 32, configured to mate with receptacles 22 on voltage adapter 12. In the preferred embodiment, once terminals 32 are mated to receptacles 22, voltage module 24 is in a parallel electrical circuit arrangement with the AC or the DC adapter circuit . Thus, the voltage drop in voltage module 24 is the same as that provided by adapter 12.

Voltage selector mechanism 34 is a conventional electrical switch disposed on voltage module 24 that allows a user to select among the DC output voltages and direct them to plug 40. By manipulating voltage selector mechanism 34 the user can select among the DC output voltages.

As shown in FIGS. 1A and 1B, module distribution bus 28 is provided on a second face 36 of voltage module 24. Module distribution bus 28 is configured similarly to voltage adapter distribution bus 20. Accordingly, voltage module 24 is capable of being mated to an additional voltage module by electrically coupling voltage module distribution bus 28 with a reception bus from the other voltage module. In this manner, as described in more detail below, voltage modules of the present invention may be coupled together to provide multiple and variable DC outputs, from a single voltage adapter, which receives power from a single AC power source. Optionally, if an additional voltage module is not added to voltage module 24, module distribution bus 28 may be capped with end cap 38 to provide protection to the bus, the circuitry, and the user.

Optionally, voltage module 24 may include a polarity switch 44 and a noise filter 42. Polarity switch 44 allows the polarity of the module to be changed, depending on the appliance and the configuration thereof. Noise filter 42 reduces noise that may be created in the electrical circuitry of the adapter and modules. The conventional circuitry and functioning of polarity switch 44 and noise filter 42 are well known and understood.

Figure 2:
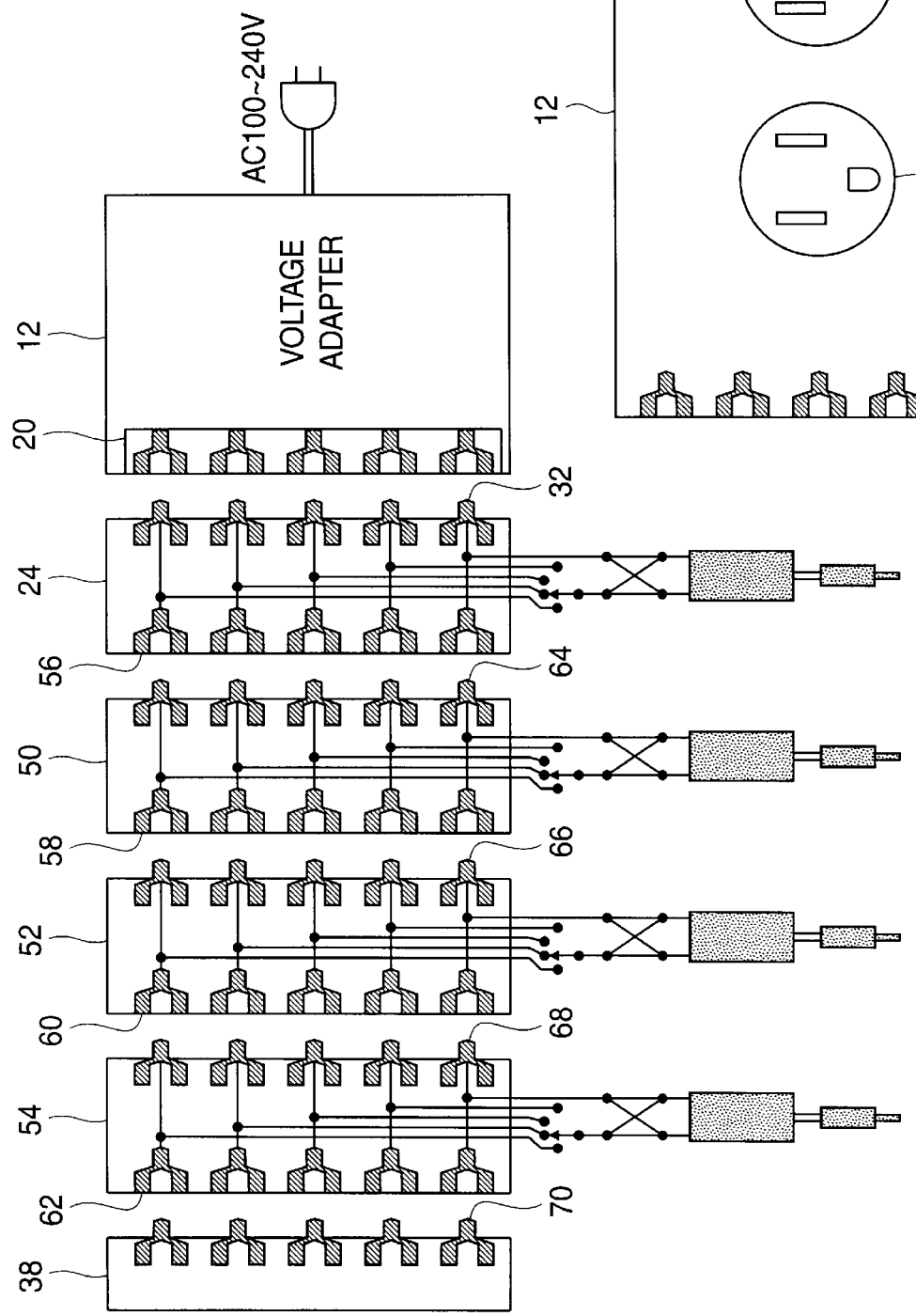
FIG. 2 is a simplified schematic illustration of multiple stackable voltage modules in accordance with an embodiment of the present invention.

Referring now to FIG. 2, in one embodiment, additional voltage modules may be added in place of cap 38 to first voltage module 24. By way of example with no intent to limit the present invention, FIG. 2 shows three add-on voltage modules 50, 52, and 54. Each voltage module 50, 52, and 54 is configured similarly to voltage module 24. Thus, in this embodiment, voltage modules 50, 52, and 54 are identical to the features and functions described above in reference to voltage module 24. As such, the modules are interchangeable. Moreover, each module when coupled together and to voltage adapter 12, provide multiple and variable DC output voltages, from the single voltage adapter, which receives power from a single AC power source.

To ensure that the modules of the present invention are interchangeable, distribution bus 20 and module distribution busses 56, 58, 60, and 62 may be identical. Accordingly, the mating terminals 32, 64, 66, and 68 on the reception busses may also be identical. The final distribution bus, in this example bus 62, may be capped with end cap 38, which also has identical terminals 70, to provide protection to the bus, the circuitry, and the user.

Figure 3:
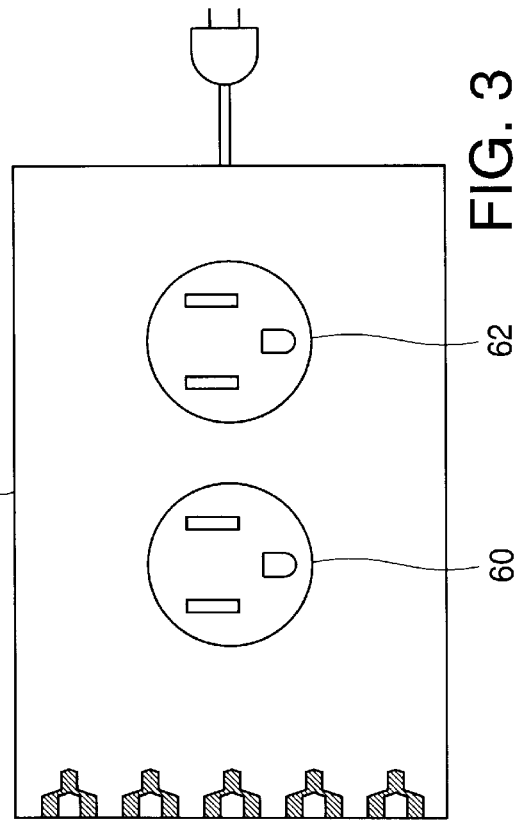
FIG. 3 is a simplified illustration of an additional embodiment of the voltage adapter in accordance with the principles of the present invention.

Referring now to FIG. 3, yet another embodiment of voltage adapter 12 is illustrated. In this embodiment, two additional AC voltage outlets 60 and 62 are provided on voltage adapter 12. The AC voltage outlets 60, 62 are configured in parallel to the power source to allow for the providing of additional AC power to additional appliances using the same power source as adapter 12. Although, two additional AC outlets are shown, optionally adapter 12 may include more AC outlets to resemble, for example, power strip adapter 104 (FIG. 4).

Figure 4:
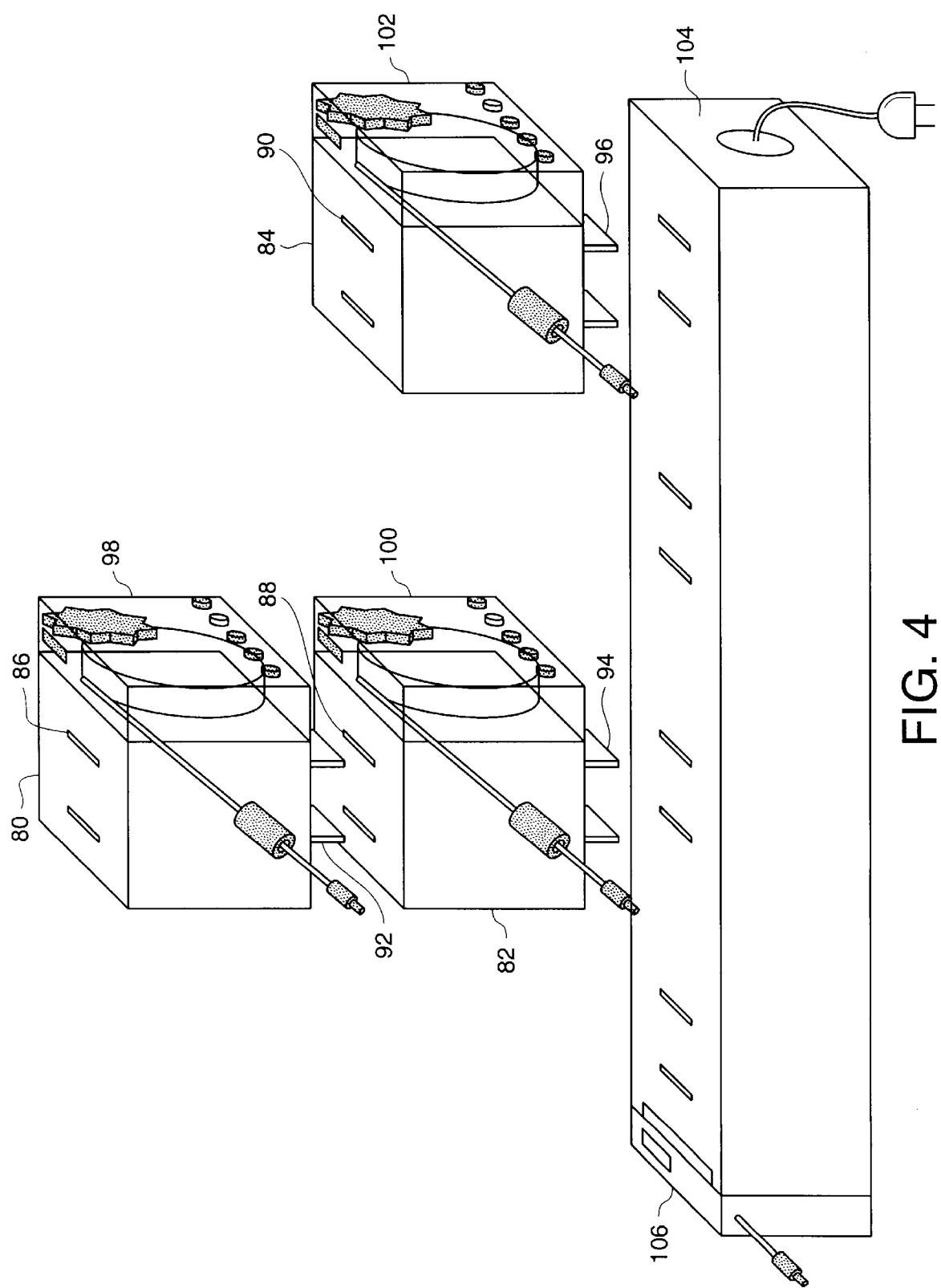
FIG. 4 is a simplified illustration of stackable embodiments of the voltage adapter with voltage modules in accordance with the principles of the present invention.

Referring now to FIG. 4, in yet another embodiment, each voltage adapter 80, 82, and 84 has at least one additional outlet 86, 88, and 90, respectively. The voltage adapters have built-in outlet prongs 92, 94, and 96. Each voltage adapter 80, 82, and 84 may have attached, a voltage module 98, 100, and 102. In this embodiment, voltage modules 98, 100, and 102 may each be configured to provide selectable DC output voltages. In an alternative embodiment, each voltage adapter 80, 82, and 84, may be formed together with modules 98, 100, and 102 as a single adapter unit. In this alternative embodiment, conventional solid state circuitry, which may include a bridge diode, voltage regulating transistors, and a bias circuit, is used to convert the 110 volt to 240 volt AC input into the desired DC outputs. In either embodiment, the voltage adapters may be stacked together, by coupling the outlet prongs to the outlets. In this manner, although more than one voltage adapter is used, only one AC power outlet is required. Power strip adapter 104 may be used to accommodate more than one adapter. Preferably power strip adapter 104 may be configured to have a plurality of AC outlets, in addition to being configured to mate with voltage module 106, consistent with embodiments described above.

Having thus described several embodiments, persons skilled in the art will recognize that changes may be made in form and detail without departing from the spirit and scope of the invention. Thus the invention is limited only by the following claims.

What is claimed is:

1. An arrangement of interconnected voltage adapter units, comprising:
    a converter unit connectable to an AC power source for providing a plurality of output voltages; and
    a first voltage unit being configured to receive said plurality of output voltages from said converter unit and output a settable DC output voltage selected from said plurality of output voltages;
    a reception bus of said first voltage unit coupleable to a distribution bus of said converter unit.

2. The arrangement of claim 1, further comprising a second voltage unit electrically coupleable to said first voltage unit, said second voltage unit being configured to provide a settable output voltage selected from said plurality of output voltages supplied from said converter unit through said first voltage unit.

3. The arrangement of claim 2, further comprising a third voltage unit electrically coupleable to said second voltage unit, said third voltage unit being configured to provide a settable output voltage selected from said plurality of output voltages supplied from said converter unit through said second voltage unit.

4. The arrangement of claim 1, wherein said converter unit comprises a first electrical connection means including a plurality of voltage distribution contacts, each one of said voltage distribution contacts capable of carrying one of said plurality of output voltages.

5. The arrangement of claim 4, wherein said first voltage unit comprises a second electrical connection means coupleable to said first connection means, said second connection means including a plurality of voltage reception contacts, each one of said voltage reception contacts capable of carrying one of said plurality of output voltages.

6. The arrangement of claim 5, wherein said first voltage unit comprises a third electrical connection means, said first electrical connection means being identical to said third electrical connection means.

7. The arrangement of claim 1, wherein said first voltage unit comprises a plurality of voltage units, each unit being identically configured and interchangeable.

8. The arrangement of claim 1, further comprising a removably detachable end cap.

9. The arrangement of claim 1, wherein said converter unit comprises a power cord for providing AC power to said converter unit.

10. The arrangement of claim 1, wherein said converter unit comprises at least one AC power outlet.

11. The arrangement of claim 1, wherein said plurality of output voltages are AC output voltages.

12. The arrangement of claim 1, wherein said plurality of output voltages are DC output voltages comprising 1.5, 4.5, 7.5, 10.5, 15 VDC.

13. The arrangement of claim 1, wherein said plurality of output voltages are DC voltages comprising 3, 6, 9, 12 VDC.

14. A method for providing a variable output voltage from a single power source through an arrangement of interconnected voltage units, said method comprising:
    coupling a first unit to an AC power source;
    transforming an AC voltage in said first unit into a plurality of stepped-down output voltages;
    coupling a second unit to said first unit to receive said plurality of stepped-down output voltages and for converting said stepped-down output voltages to alternate output voltages; and
    selecting and outputting one of said alternate output voltages from said second unit.

15. The method of claim 14, further comprising:
    electrically coupling a third unit to said second unit; and
    selecting and outputting one of said alternate output voltages from said third unit.

16. The method of claim 15, wherein the alternate output voltage selected and output from said second unit is different from the alternate output voltage selected and output from said third unit.

17. An arrangement of interconnected voltage units comprising:
    a converter unit for receiving electrical power from an AC power source, and for providing a plurality of lesser output voltages; and
    a first voltage unit electrically coupleable to said converter unit and configured to receive said plurality of lesser output voltages and output a settable output voltage selected from said plurality of lesser output voltages.

18. The arrangement of claim 17, further comprising a second voltage unit electrically coupleable to said first voltage unit, said second voltage unit configured to provide a settable DC output voltage selected from said plurality of output voltages provided from said converter unit through said first voltage unit.

19. The arrangement of claim 18, further comprising a third voltage unit electrically coupleable to said second voltage unit, said third voltage unit configured to provide a settable DC output voltage selected from said plurality of output voltages provided from said converter unit through said second voltage unit.

20. The arrangement of claim 17, wherein said first voltage unit comprises a plurality of voltage units, wherein each unit is identically configured and interchangeable.

* * * * *